(12) United States Patent
Inoue

(10) Patent No.: US 12,067,382 B2
(45) Date of Patent: Aug. 20, 2024

(54) UPDATE CONTROL APPARATUS, MOVING BODY, UPDATE CONTROL METHOD, AND COMPUTER-READABLE STORAGE MEDIUM

(71) Applicant: HONDA MOTOR CO.,LTD., Tokyo (JP)

(72) Inventor: Genta Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 135 days.

(21) Appl. No.: 17/673,814

(22) Filed: Feb. 17, 2022

(65) Prior Publication Data
US 2022/0317992 A1 Oct. 6, 2022

(30) Foreign Application Priority Data

Mar. 30, 2021 (JP) ................................ 2021-057554

(51) Int. Cl.
*G06F 8/65* (2018.01)
(52) U.S. Cl.
CPC ...................................... *G06F 8/65* (2013.01)
(58) Field of Classification Search
CPC ........................................................ G06F 8/65
See application file for complete search history.

(56) References Cited

U.S. PATENT DOCUMENTS

| | | | | |
|---|---|---|---|---|
| 2018/0018160 A1* | 1/2018 | Teraoka | .................... | G06F 8/65 |
| 2019/0146777 A1* | 5/2019 | Liu | ....................... | G06F 40/157 |
| | | | | 717/168 |
| 2019/0278587 A1* | 9/2019 | Miyake | ..................... | G06F 8/60 |
| 2019/0325666 A1* | 10/2019 | Teraoka | ............... | G07C 5/0808 |
| 2021/0117177 A1* | 4/2021 | Noda | ................... | B60R 16/0231 |
| 2021/0191661 A1* | 6/2021 | Harata | ...................... | G06F 8/61 |

(Continued)

FOREIGN PATENT DOCUMENTS

| | | | | |
|---|---|---|---|---|
| CN | 109561118 B | * | 12/2020 | ............... G06F 8/65 |
| EP | 3537287 A1 | * | 9/2019 | ........... B60R 16/023 |

(Continued)

OTHER PUBLICATIONS

Office Action issued for counterpart Japanese Application No. 2021-057554, issued by the Japanese Patent Office on Jan. 17, 2023 (drafted on Jan. 10, 2023).

*Primary Examiner* — Daxin Wu

(57) ABSTRACT

An update control apparatus includes: a first acquiring unit configured to acquire information based on a unique value of a moving-body control unit; a second acquiring unit configured to acquire version information of a program for performing control by the moving-body control unit from a first storage region of a storage apparatus provided in the moving-body control unit; a third acquiring unit configured to acquire, on a basis of the version information acquired by the second acquiring unit, a newer version of the program for performing the control by the moving-body control unit; a writing unit configured to write the new version of the program acquired by the third acquiring unit to a second storage region provided in the storage apparatus; and an instruction unit configured to output an instruction to cause the moving-body control unit to control in accordance with the program stored in the second storage region.

7 Claims, 12 Drawing Sheets

(56) References Cited

U.S. PATENT DOCUMENTS

2021/0397433 A1    12/2021  Itatsu
2022/0050811 A1*   2/2022   Li ............................ G06F 8/65

FOREIGN PATENT DOCUMENTS

| | | |
|---|---|---|
| JP | 2019191619 A | 10/2019 |
| JP | 2020027666 A | 2/2020 |
| JP | 2021012434 A | 2/2021 |
| WO | 2020080321 A1 | 4/2020 |

* cited by examiner

| ID | HASH | VERSION |
|----|-------|---------|
| 0 | 9876h | V2 |
| 1 | 1234h | V2 |
| 2 | 5678h | V2 |
| ⋮ | ⋮ | ⋮ |

*FIG.4*

| ID | VERSION | PROGRAM DATA |
|---|---|---|
| 0 | V2 | PROGRAM0_V2 |
| 1 | V3 | PROGRAM1_V3 |
| 2 | V2 | PROGRAM2_V2 |
| ⋮ | ⋮ | ⋮ |

*FIG.7*

| VID | ID 0 | ID 1 | ID 2 |
|---|---|---|---|
| V001 | V2 | V2 | V1 |
| V002 | V2 | V3 | V2 |
| ⋮ | ⋮ | ⋮ | ⋮ |

*FIG.8*

| ID | VERSION |
|----|---------|
| 0 | V2 |
| 1 | V1 |
| 2 | V1 |
| ⋮ | ⋮ |

*FIG.10*

|  | CASE 1: MATCHED WITH VERSION OF PROGRAM SCHEDULED TO BE INSTALLED ACCORDING TO UPDATE | CASE 2: OLDER THAN CURRENT VERSION | CASE 3: DESIGNED FOR DIFFERENT SYSTEM | CASE 4: SAME VERSION AS CURRENT ONE |
|---|---|---|---|---|
| TIMING 1: BEFORE RECEPTION OF UPDATE INFORMATION | PERFORM CONFIGURATION SYNCHRONIZATION | PERFORM CONFIGURATION SYNCHRONIZATION | PERFORM CONFIGURATION SYNCHRONIZATION | PERFORM CONFIGURATION SYNCHRONIZATION |
| TIMING 2: WRITING IS BEING PERFORMED | ABANDON UPDATE INFORMATION PERFORM CONFIGURATION SYNCHRONIZATION | ABANDON UPDATE INFORMATION PERFORM CONFIGURATION SYNCHRONIZATION | ABANDON UPDATE INFORMATION PERFORM CONFIGURATION SYNCHRONIZATION | ABANDON UPDATE INFORMATION PERFORM CONFIGURATION SYNCHRONIZATION |
| TIMING 3: AFTER COMPLETION OF WRITING | ABANDON UPDATE INFORMATION PERFORM CONFIGURATION SYNCHRONIZATION | ABANDON UPDATE INFORMATION PERFORM CONFIGURATION SYNCHRONIZATION | ABANDON UPDATE INFORMATION PERFORM CONFIGURATION SYNCHRONIZATION | ABANDON UPDATE INFORMATION PERFORM CONFIGURATION SYNCHRONIZATION |
| TIMING 4: AFTER COMPLETION OF ACTIVATION | SUCCESS NOTICE | FAILURE NOTICE | FAILURE NOTICE | FAILURE NOTICE |

*FIG.11*

UPDATE CONTROL APPARATUS, MOVING BODY, UPDATE CONTROL METHOD, AND COMPUTER-READABLE STORAGE MEDIUM

The contents of the following Japanese patent application(s) are incorporated herein by reference: NO. 2021-057554 filed on Mar. 30, 2021.

BACKGROUND

1. Technical Field

The present invention relates to an update control apparatus, a moving body, an update control method, and a computer-readable storage medium.

2. Related Art

Patent document 1 discloses an ECU which is used for a vehicle and for which an app program can be rewritten.
Patent Document 1: Japanese Patent Application Publication No. 2020-27666

BRIEF DESCRIPTION OF THE DRAWINGS

FIG. 4 shows, in a table form, management information in the control system 200;

FIG. 7 shows, in a table form, program registration information stored by an external apparatus 70;

FIG. 8 shows, in a table form, configuration information stored by the external apparatus 70;

FIG. 10 shows management information stored by respective ECUs of a vehicle 20 after maintenance;

FIG. 11 shows a mapping of processes executed by the control system 200 to combinations of program versions and timings at which the IG of the vehicle 20 is turned on.

DESCRIPTION OF EXEMPLARY EMBODIMENTS

The following describes the present invention by referring to embodiments thereof. However, the embodiments described hereinafter do not limit the invention as in the claims. Not all of the combinations of features described in the embodiments are necessarily essential for the solution of the invention.

Figure 1:
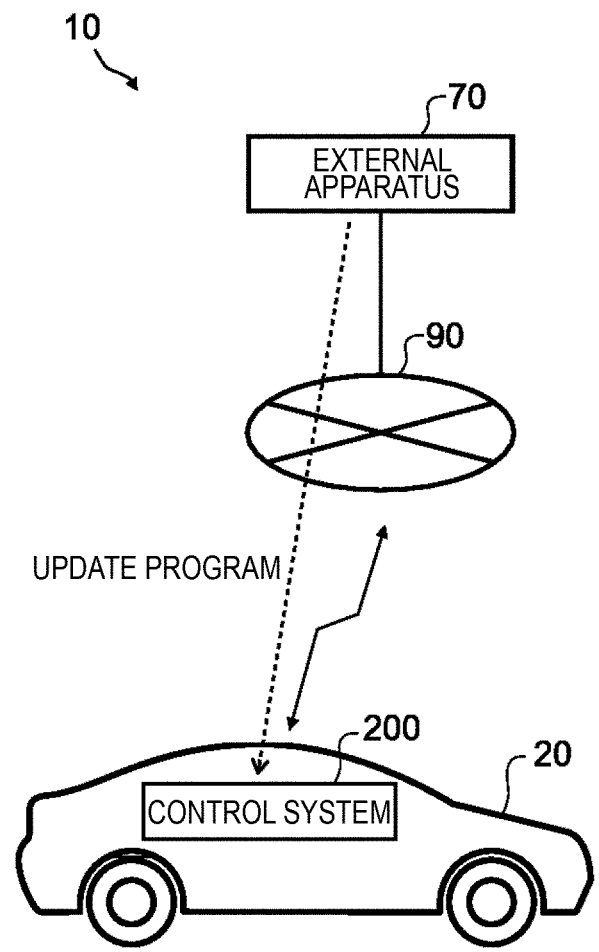
FIG. 1 schematically shows an update system 10 according to an embodiment.

FIG. 1 schematically shows an update system 10 according to an embodiment. The update system 10 includes a vehicle 20 and an external apparatus 70. The vehicle 20 includes a control system 200. The control system 200 is responsible for control of the vehicle 20 and communication with the external apparatus 70 via a communication network 90. The communication network 90 includes, for example, an IP network such as the Internet, a P2P network, a private line including a VPN, a virtual network, and/or a mobile communication network.

In the vehicle 20, the control system 200 includes a plurality of electronic control units (ECUs) for controlling the vehicle 20. The control system 200 acquires, from an external element, an update program for an ECU provided in the control system 200. For example, the control system 200 may receive, through wireless communication via the communication network 90, an update program transmitted from the external apparatus 70. The external apparatus 70 may be a server that delivers an update program. The control system 200 reprograms an ECU provided in the control system 200 by using the update program. The reprogramming is performed in order to, for example, upgrade the function of the ECU provided in the control system 200. In this way, the control system 200 updates an ECU by reprogramming the ECU over the air (in an OTA manner). In the present embodiment, update of a device such as an ECU using an update program is referred to as "program update."

The present embodiment mainly describes situations in which program update is performed for an ECU including an active program storage region and an inactive program storage region. Program update for an ECU including program storage regions on two sides as described above includes a process of writing an update program to an inactive side of the ECU, and a process of activating the update program written to the inactive side of the ECU.

In this regard, after the update program is written to the ECU, the ECU may be replaced with another ECU before the activation is performed. For example, after an update program is written to an ECU, the vehicle 20 may undergo maintenance, and the ECU in the control system 200 may be replaced with another ECU. If the version of the program of the ECU newly mounted in the control system 200 due to the maintenance of the vehicle 20 is different from the version of the program of the ECU before the replacement, the replacement of the ECU can be sensed from the difference in version. In a scheme in which ECU replacement is sensed, as described above, from a difference in version between the programs before and after the ECU replacement, however, the ECU replacement cannot be correctly sensed if there is no change in version between the programs before and after the replacement. In this case, activating a program on the inactive side of the newly mounted ECU after the replacement may activate an old version of a program written to the inactive side of the newly mounted ECU after the replacement.

Accordingly, the control system 200 senses ECU replacement by managing hardware serial numbers of ECUs. For example, when an IG power source of the vehicle 20 is turned on, the control system 200 may collect the hardware serial numbers of respective ECUs; and when sensing ECU replacement, the control system 200 may inquire about the presence/absence of an update program for an ECU mounted as a result of the replacement, so as to update the program of the ECU mounted as a result of the replacement to a proper version. Meanwhile, after writing an update program to an ECU, the control system 200, when ECU replacement is sensed before activation is performed, may restrict the activation. In this way, an old version of a program written to the inactive side of the newly mounted ECU after replacement can be prevented from being activated.

Figure 2:
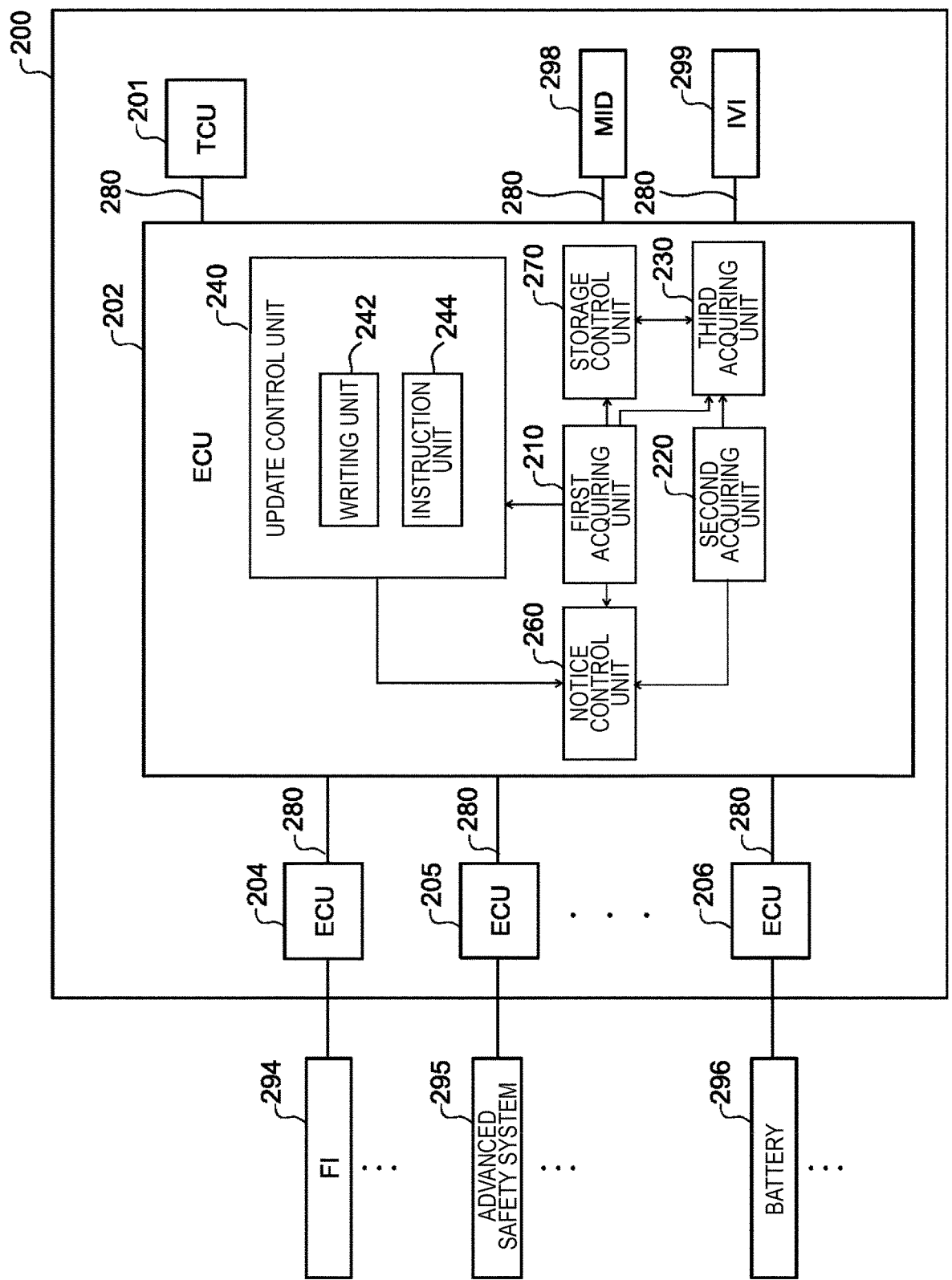
FIG. 2 schematically shows a system configuration provided in a control system 200.

FIG. 2 schematically shows a system configuration provided in the control system 200. The control system 200 includes a TCU 201, ECUs 202, 204, 205, and 206, a MID 298, and an IVI 299. In FIG. 2, a FI 294, an advanced safety system 295, and a battery 296 are examples of devices to be controlled in the vehicle 20.

The ECU 202 is connected to the TCU 201 and the ECUs 204, 205, and 206 via in-vehicle communication lines 280. The ECU 202 mutually communicate with the TCU 201 and the ECUs 204, 205, and 206, the MID 298, and the IVI 299 via the in-vehicle communication lines 280. The ECU 202 performs overall control for the TCU 201, the ECUs 204, 205, and 206, the MID 298, and the IVI 299. For example, the in-vehicle communication lines 280 may include a controller area network (CAN) and/or an ether network.

The TCU 201 is a telematics control unit. The TCU 201 is responsible mainly for mobile communication. The TCU 201 transmits/receives data to/from the external apparatus 70 on the basis of control performed by the ECU 202. On the basis of control performed by the ECU 202, the TCU 201 receives, through mobile communication, an update program transmitted from the external apparatus 70. The TCU 201 may function as a wireless communication unit.

The MID 298 is a multi-information display. For example, the IVI 299 may be an in-vehicle infotainment information device (IVI). The MID 298 and the IVI 299 may function as display control units. The IVI 299 includes a wireless LAN communication function. On the basis of control performed by the ECU 202, the IVI 299 may receive, through wireless LAN communication, an update program transmitted from the external apparatus 70.

The ECUs 204, 205, and 206 each serve as a vehicle control unit for controlling the vehicle 20. The ECUs 204, 205, and 206 are examples of a "moving-body control unit." The ECUs 204, 205, and 206 control various devices provided in the vehicle 20. For example, the ECU 204 may directly or indirectly control the FI 294, i.e., a fuel injection apparatus, and other elements. The ECU 205 directly or indirectly controls, for example, the advanced safety system 295. The ECU 206 directly or indirectly controls, for example, the battery 296. For example, the battery 296 may function as a 12-V power source for the vehicle. The battery 296 is, for example, a lead storage battery.

With respect to the present embodiment, a system configuration is exemplified in which the control system 200 includes the TCU 201, the ECUs 202, 204, 205, and 206, the MID 298, and the IVI 299. However, the system configuration of the control system 200 is not limited to the example in the present embodiment. The present embodiment is described, as an example, on the assumption that moving-body control units, for which a program update may be performed, are the ECUs 204 and 205 and that the ECU 202 functions as an update control unit for controlling the program update. Moving-body control units, for which a program update may be performed, are not limited to these ECUs. A moving-body control unit, for which a program update may be performed, may be any of the TCU 201, the ECUs 202, 204, 205, and 206, the MID 298, and the IVI 299.

The ECU 202 includes a first acquiring unit 210, a second acquiring unit 220, a third acquiring unit 230, an update control unit 240, a notice control unit 260, and a storage control unit 270. The update control unit 240 includes a writing unit 242 and an instruction unit 244. The ECU 202 is an example of an update control apparatus.

The first acquiring unit 210 acquires information based on a unique value of an ECU that controls at least a portion of the vehicle 20. This example is described on the assumption that an "ECU" indicates a moving-body control unit for which a program update may be performed. For example, a unique value may be a hardware serial number written to an ECU. For example, the "information based on a unique value" may be a hash value of the hardware serial number of an ECU. The first acquiring unit 210 may receive a unique value from an ECU and calculates the hash value of the unique value. The unique value and the hash of the unique value are written to the ECU. The first acquiring unit 210 may acquire the hash value written to the ECU.

The second acquiring unit 220 acquires version information of a program for performing control by an ECU from a first storage region of a storage apparatus provided in the ECU. On the basis of the version information acquired by the second acquiring unit 220, the third acquiring unit 230 acquires a newer version of the program for performing control by the ECU. The writing unit 242 writes the new version of the program acquired by the third acquiring unit 230 to a second storage region provided in the storage apparatus. The instruction unit 244 outputs an instruction to cause the ECU to control in accordance with the program stored in the second storage region. The instruction unit 244 outputs the instruction after acquiring the information based on the unique value acquired by the first acquiring unit 210.

The storage control unit 270 may cause the information based on the unique value acquired by the first acquiring unit 210 to be stored. The instruction unit 244 may output the instruction when information based on a unique value newly acquired by the first acquiring unit 210 is consistent with the information stored by the storage control unit 270.

The instruction unit 244 may not output the instruction when information based on the unique value newly acquired by the first acquiring unit 210 is inconsistent with the information stored by the storage control unit 270.

When information based on the unique value newly acquired by the first acquiring unit 210 is inconsistent with the information stored by the storage control unit 270, the second acquiring unit 220 newly acquires version information of a program for performing control by the ECU, and on the basis of the version information newly acquired by the second acquiring unit 220, the third acquiring unit 230 may acquire again a newer version of the program for performing control by the ECU from the external apparatus 70 external to the vehicle 20.

At powering-on of the vehicle 20, the first acquiring unit 210 newly acquires information based on the unique value of an ECU, and the instruction unit 244 may determine whether the information based on the unique value newly acquired by the first acquiring unit 210 is consistent with the information stored by the storage control unit 270.

At powering-on of the vehicle 20 performed after the instruction unit 244 outputs an instruction, the first acquiring unit 210 newly acquires information based on the unique value of the ECU, and the second acquiring unit 220 newly acquires version information of the program for performing control by the ECU. The notice control unit 260 notifies that the version of the program for performing control by the ECU is updated, when the information based on the unique value newly acquired by the first acquiring unit 210 at the powering-on of the vehicle 20 after the output of the instruction from the instruction unit 244 is inconsistent with the information stored by the storage control unit 270, in a case where the version information newly acquired by the second acquiring unit 220 at the powering-on of the vehicle 20 after the output of the instruction from the instruction unit 244 is consistent with version information of the program that was stored in the second storage region when the instruction unit 244 output the instruction.

The first acquiring unit 210 may newly acquire information based on the unique value of the ECU at powering-on of the vehicle 20 performed in a period after a moment at which the writing unit 242 starts to write, to the second storage region, the new version of the program acquired by the third acquiring unit 230, and before a moment at which the instruction unit 244 outputs an instruction. When information based on a unique value newly acquired by the first acquiring unit 210 at the powering-on of the vehicle 20 performed in the period is inconsistent with information stored by the storage control unit 270, the second acquiring unit 220 newly acquires version information of the program for performing control by the ECU, and on the basis of the version information newly acquired by the second acquiring unit 220, the third acquiring unit 230 may acquire again a newer version of the program for performing control by the ECU from the external apparatus 70 external to the vehicle 20.

The following describes a program update. Descriptions are given of a program update process performed when a device, for which a program update is performed, is an ECU and this ECU includes a single-bank memory (so-called one-sided ROM) for storing firmware. In this case, because the ECU includes one program storage region for storing firmware, when the ECU is operated in accordance with a program stored in the program storage region, an update program cannot be written to the program storage region. When performing a program update for the ECU, the writing unit 242 forwards an update program to the ECU and causes the update program to be written to a preset program storage region of the ECU, and then the instruction unit 244 instructs the ECU to activate the update program. For example, the activation of the update program may include a process of setting a power-on parameter for the ECU such that, at powering-on of the ECU, the update program is loaded to start control based on the update program.

Next, descriptions are given of a program update process performed when an ECU includes a double-bank memory (so-called two-sided ROM) as an internal memory. In this case, the ECU includes two program storage regions for storing firmware. Thus, for example, when the ECU is operated in accordance with a program stored in a first program storage region, an update program can be written to a second program storage region. In particular, while operations are performed according to a program stored in the first program storage region, which constitutes a front side (active side), the update program can be written to the second program storage region, which constitutes a back side (inactive side), through so-called back-side writing. Hence, even while, for example, the vehicle 20 is traveling, the update program can be written to the second program storage region. Accordingly, even while the vehicle 20 is traveling, the writing unit 242 can forward an update program to the ECU and cause the update program to be written to the second program storage region. Upon the writing of the update program to the second program storage region of the ECU being completed, the instruction unit 244 instructs the ECU to activate the update program written to the second program storage region. For example, the activation of the update program may include a process of setting a power-on parameter for the ECU such that, at powering-on of the ECU, the update program stored in the second program storage region is loaded to start control based on the update program. For example, the activation of the update program may include a process of validating the second program storage region as a program readout region and invalidating the first program storage region as a program readout region. Accordingly, a "program update" is a concept that includes giving an instruction to write an update program to a program storage region of an ECU. A "program update" is also a concept that includes giving an instruction to activate an update program written to a program storage region.

In a program update for an ECU including a single-bank memory as an internal memory, the ECU may be incapable of controlling the vehicle while an update program is being written to the program storage region or while the update program is being activated. Meanwhile, in a program update for an ECU including a double-bank memory as an internal memory, the ECU can control the vehicle while an update program is being written to the program storage region on the back side. With respect to the present embodiment, descriptions are given of situations in which an ECU including a double-bank memory as an internal memory is updated. For example, descriptions may be given on the assumption that the ECU 205, which includes a double-bank memory as an internal memory, is replaced during vehicle maintenance.

Figure 3:
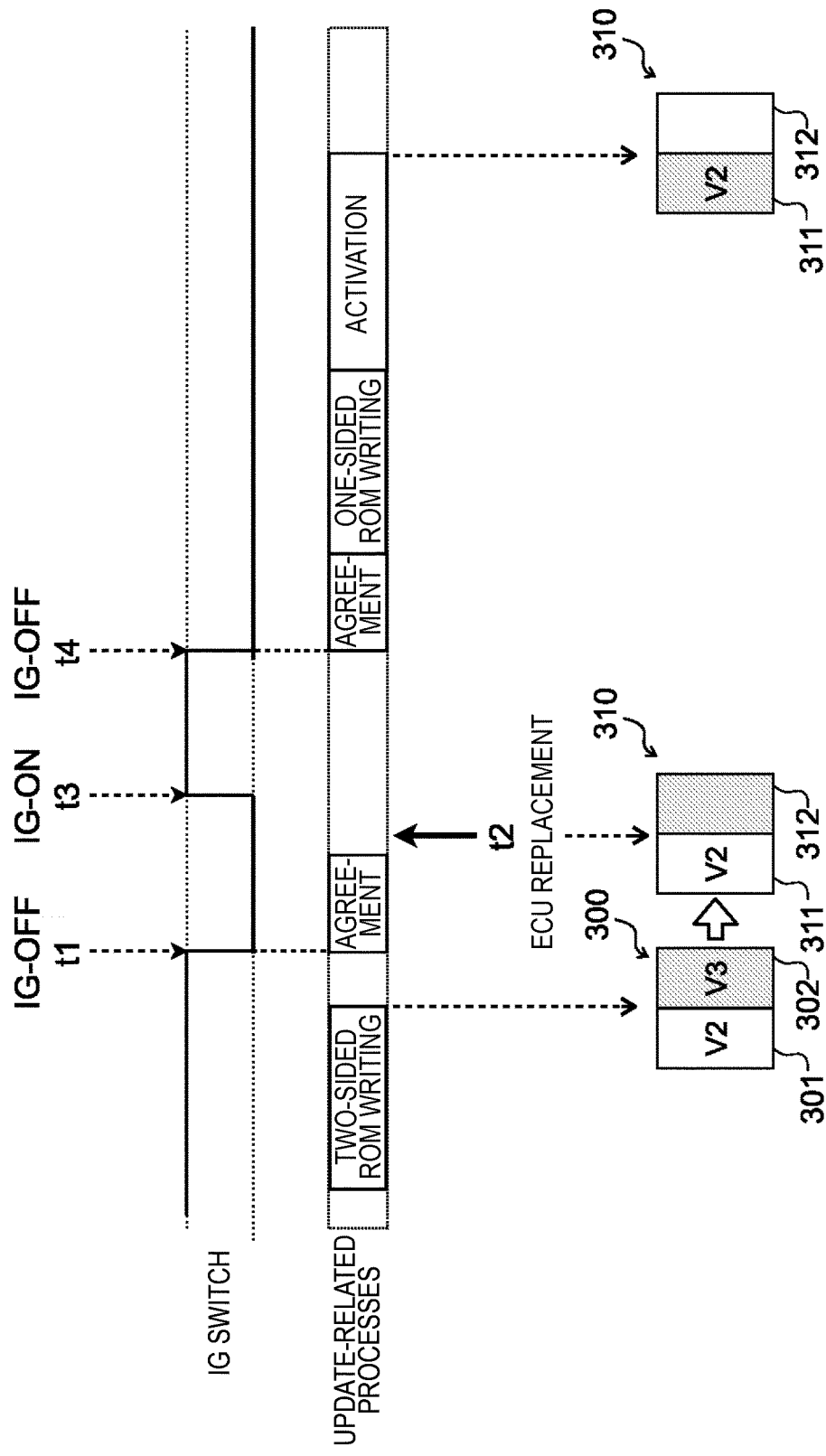
FIG. 3 schematically shows a time chart pertaining to a program update process.

FIG. 3 schematically shows a time chart pertaining to a program update process. The time chart in FIG. 3 is intended to illustrate a problem that arises due to ECU replacement in a program update. FIG. 3 shows the state of the IG switch, the states of execution of update-related processes, and the states of the program storage regions of ECUs. Note that a device, for which the program update is performed, is the ECU 205. The ECU 205 includes a double-bank memory.

In FIG. 3, a program storage region 300 of the ECU 205 includes a first storage region 301 and a second storage region 302. Assume that the first storage region 301 is the current active side and that a version V2 of a program has been written to the first storage region 301. Thus, the version V2 of the program performs control by the ECU 205.

Before the IG switch is turned off at time t1, the writing unit 242 causes the ECU 205 to write a version V3 of a program to the second storage region 302 (two-sided ROM writing), thereby completing the writing. Upon the IG switch being turned off at time t1, the ECU 202 causes the MID 298 or the IVI 299 to display, for the user of the vehicle 20, an agreement screen pertaining to execution of the program update. In this example, in order to perform a task of replacing the ECU 205, the user of the vehicle 20 gives an instruction to perform the program update at a later time, i.e., not to perform the program update at present. As shown in FIG. 3, while the IG power source is in an off state, at time t2, the ECU 205 is removed, and a new ECU is mounted in the control system 200.

The program storage region 310 shown in FIG. 3 indicates the program storage region of the newly mounted ECU. The program storage region 310 includes a first storage region 311 and a second storage region 312. Assume that the first storage region 311 is the current active side and that the version V2 of a program, i.e., the same version as the program written to the first storage region 301, has been written to the first storage region 311. Thus, the newly mounted ECU is in a state in which the version V2 of the program performs control by the ECU. Meanwhile, no programs for performing control by the ECU have been written to the second storage region 312, which is the inactive side.

Afterward, when the IG switch is turned on at time t3 and then turned off at time t4, the ECU 202 causes the MID 298 or the IVI 299 to display, for the user of the vehicle 20, the agreement screen pertaining to execution of the program update. Assume that the user of the vehicle 20 agrees to the execution of the program update. When there is an update program for a one-sided ROM of, for example, the ECU 204, the writing unit 242 causes the ECU including a one-sided ROM to write the update program (one-sided ROM writing). Upon the writing of the update program to the ECU including a one-sided ROM being completed, the instruction unit 244 instructs all the ECUs that are to be updated to activate the update program.

Upon the ECU mounted as a result of the replacement being activated, the second storage region 312 of the program storage region 310 is activated to be set as an active side, and the first storage region 311 is set as an inactive side. Thus, the control system 200 may be incapable of implementing the full function. Even if a certain version of a program is stored in the second storage region 312, as long as the version of this program is not V3, the control system 200 overall may be incapable of implementing the full function.

It can also be checked whether ECU replacement has been performed by checking the version of the program of each ECU. However, it cannot be sensed that ECU replacement has been performed by checking the version of the program of each ECU at the time t3 at which the IG switch is turned on, because, as shown in FIG. 3, the version of the program stored on the active side of the newly mounted ECU is V2.

Next, descriptions are given of an example of a technique for managing a program update for ECUs by using the hardware serial numbers of the ECUs. FIG. 4 shows, in a table form, management information in the control system 200. For example, the management information may be stored in the internal memory of the ECU 202.

The management information maps IDs, hash values, and versions to each other. "ID" indicates identification information of the types of a plurality of ECUs to be updated in the control system 200.

"Hash value" is the hash value of the hardware serial number of each ECU. Each ECU has a hash value written thereto at shipment of the vehicle 20 or shipment of the ECU as a component, in a manner such that the hash value is substantially incapable of being updated by an external element. A hardware serial number is stored in a storage medium that cannot be rewritten through a program update. A hardware serial number is an example of a "unique value." The first acquiring unit 210 of the ECU 202 receives hardware serial numbers from the respective ECUs and calculates the hash values of the hardware serial numbers. When a hash value calculated by the first acquiring unit 210 is different from hash values stored in "hash value" in the management information, the ECU 202 can determine that ECU replacement has been performed. When it is determined that ECU replacement has been performed, preset processes to be executed when ECU replacement occurs are performed, and then information of "hash value" in the management information is updated. Every time the IG is turned on, the first acquiring unit 210 acquires hardware serial numbers from the respective ECUs and calculates hash values.

The versions are information indicating the current versions of programs for performing control by the respective ECUs. The second acquiring unit 220 of the ECU 202 receives version information of programs from the respective ECUs and updates the information of "version" in the management information. Every time the IG is turned on, the second acquiring unit 220 acquires the versions of programs from the respective ECUs.

In the present embodiment, an ID "0" indicates the ECU 204, an ID "1" indicates the ECU 205, and an ID "2" indicates the ECU 206. The example shown in FIG. 4 indicates that the programs of the ECUs 204, 205, and 206 have the same version name "V2." Information stored by the respective ECUs is collected by the ECU 202 at powering-on of the vehicle 20 and stored by the ECU 202 as management information. The collected management information is transmitted to the external apparatus 70 in a portion of a process performed by the third acquiring unit 230 so as to acquire an update program.

Figure 5:
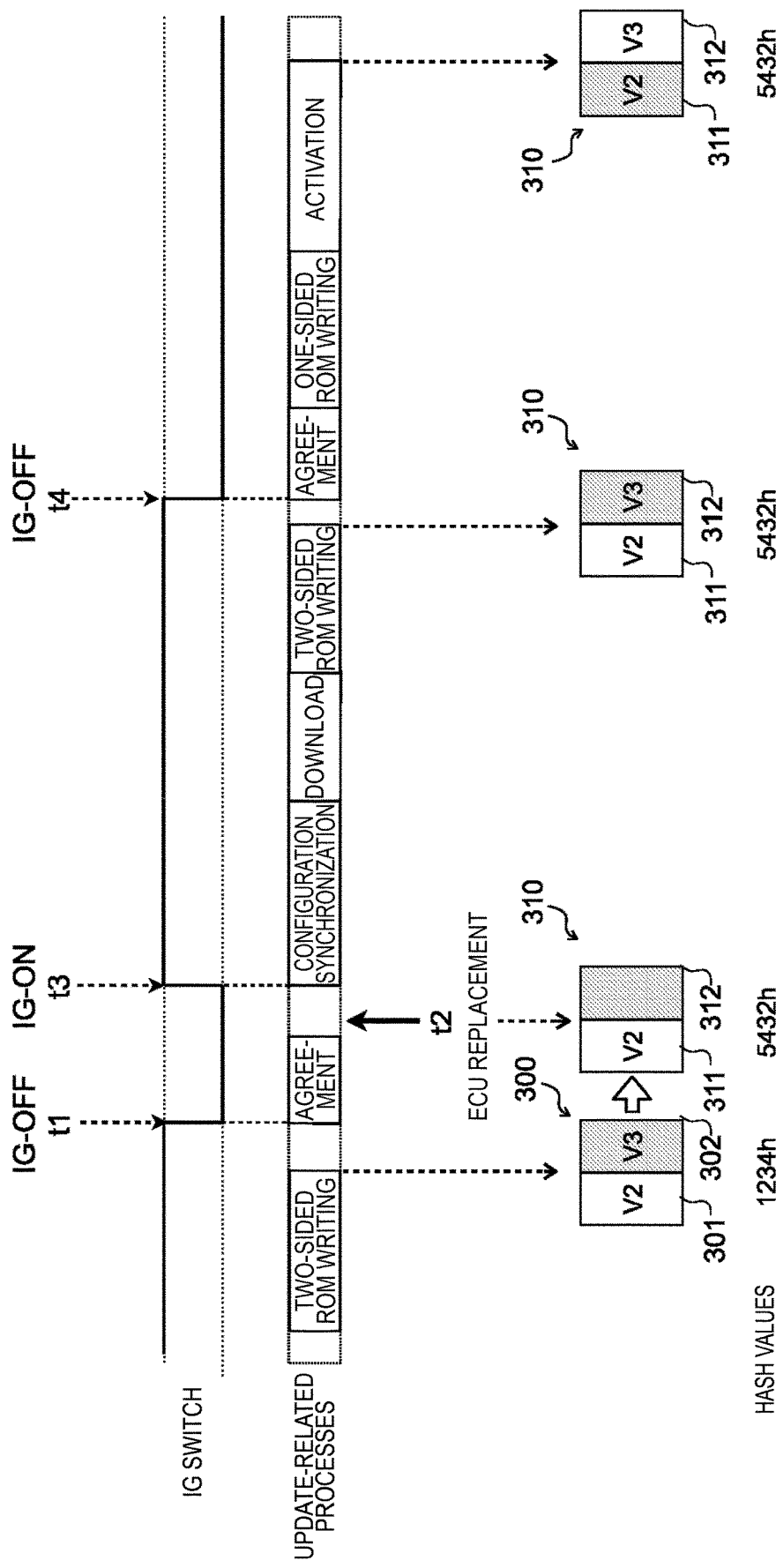
FIG. 5 schematically shows a time chart pertaining to a program update process.

FIG. 5 schematically shows a time chart pertaining to a program update process. The time chart in FIG. 5 is intended to illustrate a method for controlling a program update by using hardware serial numbers. FIG. 5 shows the state of the IG switch, the states of execution of update-related processes, the states of the program storage regions of ECUs, and the hash values of the hardware serial numbers of the ECUs. Note that a device, for which the program update is performed, is the ECU 205. As described above, the ECU 205 includes a double-bank memory.

As in FIG. 3, in FIG. 5, the program storage region 300 of the ECU 205 includes a first storage region 301 and a second storage region 302, the first storage region 301 is the current active side, and the version 2 of a program has been written to the first storage region 301. The program storage region 300, the first storage region 301, the second storage region 302, the program storage region 310, the first storage region 311, and the second storage region 312 in FIG. 5 are the same as those described above by referring to FIG. 3.

As in the case of FIG. 3, before the IG switch is turned off at time t1, the writing unit 242 causes the ECU 205 to write the version V3 of a program to the second storage region 302 (two-sided ROM writing), thereby completing the writing. Upon the IG switch being turned off at time t1, the ECU 202 causes the MID 298 or the IVI 299 to display, for the user of the vehicle 20, an agreement screen pertaining to execution of the program update. In order to perform a task of replacing the ECU 205, the user of the vehicle 20 gives an instruction to perform the program update at a later time, i.e., not to perform the program update at present. As shown in FIG. 5, while the IG power source is in an off state, at time t2, the ECU 205 is removed, and a new ECU is mounted in the control system 200.

As in the case of FIG. 3, assume that the first storage region 311 of the newly mounted ECU is the current active side and that the version V2 of a program, i.e., the same version as the program written to the first storage region 301, has been written to the first storage region 311. Thus, the newly mounted ECU is in a state in which the version V2 of the program performs control by the ECU. Meanwhile, no programs for performing control by the ECU have been written to the second storage region 312, which is the inactive side.

After the ECU 205 is replaced, the IG switch is turned on at time t3. In this case, the first acquiring unit 210 receives a hardware serial number from the ECU mounted as a result of the replacement, and calculates the hash value "5432h" of the received hardware serial number. The second acquiring unit 220 also acquires, from each of the plurality of ECUs, the version of a program for controlling the ECU, and updates the information of "version" in the management information.

By referring to the management information, the update control unit 240 determines that the ECU 205 has been replaced, because the hash value "5432h" of the hardware serial number received from the ECU mounted as a result of the replacement is different from the hash value "1234h" of the ECU 205 stored in the management information. In this case, the third acquiring unit 230 transmits the management information to the external apparatus 70, so as to make management information managed by the external apparatus 70 synchronous with the management information managed by the ECU 202 and cause the external apparatus 70 to check an update program for the respective ECUs of the control system 200 (configuration synchronization).

Upon receipt of the management information from the vehicle 20, the external apparatus 70 searches for an update program for the respective ECUs of the vehicle 20 on the basis of the management information. When an update program is present, the vehicle 20 receives the update program from the external apparatus 70 (download). Note that details of the communication between the vehicle 20 and the external apparatus 70 performed in this case are described hereinafter.

Upon the reception of the update program being completed, the writing unit 242 causes the newly mounted ECU to write the update program to the second storage region 312 of the newly mounted ECU. After the writing of the update program is completed, upon the IG switch being turned off at time t4, the ECU 202 causes the MID 298 or the IVI 299 to display, for the user of the vehicle 20, an agreement screen pertaining to execution of the program update. Assume that the user agrees to the execution of the program update. At the above-described download, when an update program for an ECU including a one-sided ROM is downloaded, the writing unit 242 causes the ECU including a one-sided ROM to write the update program to itself (one-sided ROM writing). Upon the writing of the update program to the ECU including a one-sided ROM being completed, the instruction unit 244 instructs all the ECUs that are to be updated to activate the update program. As a result, the second storage region 312 of the newly mounted ECU is set as an active side. Thus, the newly mounted ECU is controlled by the version V3 of the program stored in the second storage region 312.

When the ECU 205 is replaced with another ECU after an update program is written to the inactive side of the ECU 205, the ECU replacement can be sensed, as described above with reference to FIG. 5, by using hardware serial numbers, thereby preventing the activation for the ECUs. In particular, when ECU replacement is sensed, an ongoing program update process may be aborted, an optimum update program for the current ECU configuration may be acquired from the external apparatus 70 on the basis of the current management information, and a program update can be performed using the acquired update program.

FIG. 5 has been described by referring to a situation in which an ECU is replaced after the writing of an update program (two-sided ROM writing) is completed. However, also in a situation in which ECU replacement is performed in a period after a moment at which an update program started to be written and before a moment at which the writing is completed, when the ECU replacement is sensed on the basis of hash values upon the turning-on of the IG, the current update program may be abandoned, and a new update program may be downloaded from the external apparatus 70.

Figure 6:
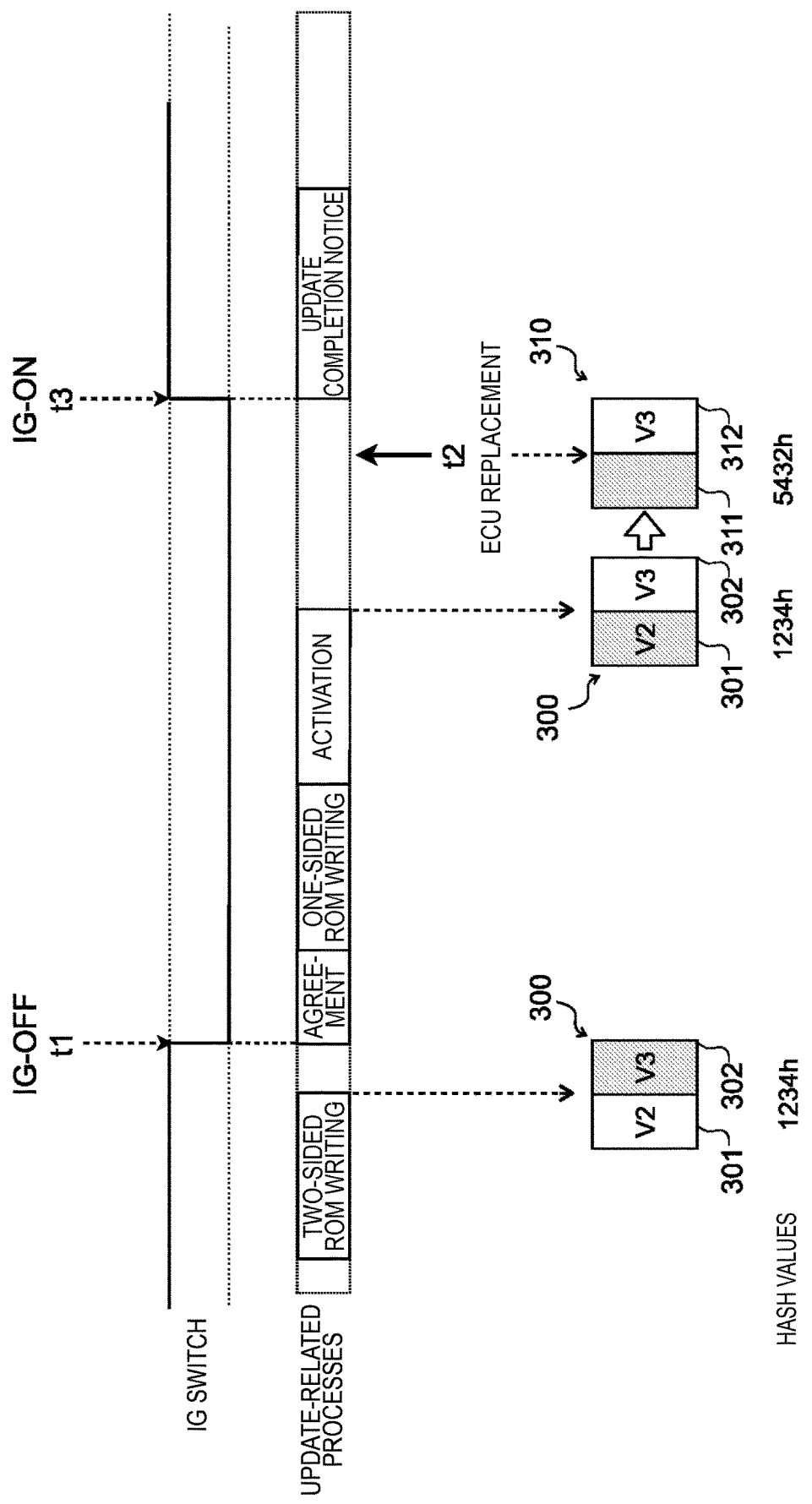
FIG. 6 schematically shows another time chart pertaining to a program update process.

FIG. 6 schematically shows another time chart pertaining to a program update process. The time chart in FIG. 6 is intended to illustrate a control method implemented when an ECU is replaced after an activation process is performed. FIG. 6 shows the state of the IG switch, the states of execution of update-related processes, the states of the program storage regions of ECUs, and the hash values of the hardware serial numbers of the ECUs. Note that a device, for which the program update is performed, is the ECU 205. As described above, the ECU 205 includes a double-bank memory.

As in FIG. 5, in FIG. 6, the program storage region 300 of the ECU 205 includes a first storage region 301 and a second storage region 302, the first storage region 301 is the current active side, and the version V2 of a program has been written to the first storage region 301. The program storage region 300, the first storage region 301, the second storage region 302, the program storage region 310, the first storage region 311, and the second storage region 312 in FIG. 6 are the same as those described above by referring to FIG. 3.

As in the case of FIG. 5, before the IG switch is turned off at time t1, the writing unit 242 causes the ECU 205 to write the version V3 of a program to the second storage region 302 (two-sided ROM writing), thereby completing the writing. Upon the IG switch being turned off at time t1, the ECU 202 causes the MID 298 or the IVI 299 to display, for the user of the vehicle 20, an agreement screen pertaining to execution of the program update.

When the user agrees to the execution of the program update, in a case where an update program for an ECU including a one-sided ROM is present, the writing unit 242 causes the ECU including a one-sided ROM to write the update program to itself (one-sided ROM writing). Upon the writing of the update program to the ECU including a one-sided ROM being completed, the instruction unit 244 instructs all the ECUs that are to be updated to activate the update program. As a result, the second storage region 302 of the ECU 205 is set as an active side. Thus, the ECU 205 can be controlled by the version V3 of the program stored in the second storage region 302.

In this example, the user of the vehicle 20 performs a task of replacing the ECU 205. While the IG power source is in an off state, at time t2, the ECU 205 is removed, and a new ECU is mounted in the control system 200.

Assume that the second storage region 312 of the newly mounted ECU is an active side and that the version V3 of a program is stored in the second storage region 312. In this case, when the IG switch is turned on at time t3 after the ECU replacement, the second acquiring unit 220 determines that the ECU 205 has been replaced, because a hash value calculated by the first acquiring unit 210 is different from the hash value of the ECU 205 stored in the management information.

Meanwhile, according to the version information of the programs of the ECUs acquired by the second acquiring unit 220, the update control unit 240 recognizes that the version of the program of the newly mounted ECU is the version V3. In this case, the version V3 of the program in the second storage region 302 that was activated by the ECU 205 in the previous activation matches the version V3 of the program of the newly mounted ECU, so the update control unit 240 determines that the newly mounted ECU can be used as is. In this case, upon the IG switch being turned on at time t3, the notice control unit 260 causes the MID 298 and the IVI 299 to display an update completion notice.

If the version V3 of the program in the second storage region 302 that was activated by the ECU 205 in the previous activation did not match the version of the program of the newly mounted ECU, the update control unit 240 would determine that the newly mounted ECU cannot be used as is. In this case, upon the IG switch being turned on at time t3, the notice control unit 260 causes the MID 298 and the IVI 299 to display a notice indicating the update was incapable of being performed. In this situation, the notice control unit 260 may provide a notice encouraging maintenance to be performed by, for example, a dealer.

In the control system 200, as described above, the ECU 202 acquires and manages the hash values of the hardware serial numbers of the respective ECUs and version information of the programs of the respective ECUs. Hence, when an ECU is replaced, the program environment can be automatically maintained in the latest state. Moreover, the vehicle 20 is unlikely to need to undergo maintenance by the dealer.

FIG. 7 shows, in a table form, program registration information stored by the external apparatus 70. Program registration information is stored by the external apparatus 70.

The program registration information includes "ID", "version," and "program data. An "ID" is identification information of the type of an ECU. A "version" is the version name of a program for controlling an ECU. "Program data" is information for specifying image data of a program for controlling an ECU. When image data of a new version of a program is registered in the external apparatus 70 by an external element, the registered image data of the program, identification information of an ECU for which the program is to be operated, and a version name are mapped to each other and stored in an internal memory.

Figure 8:
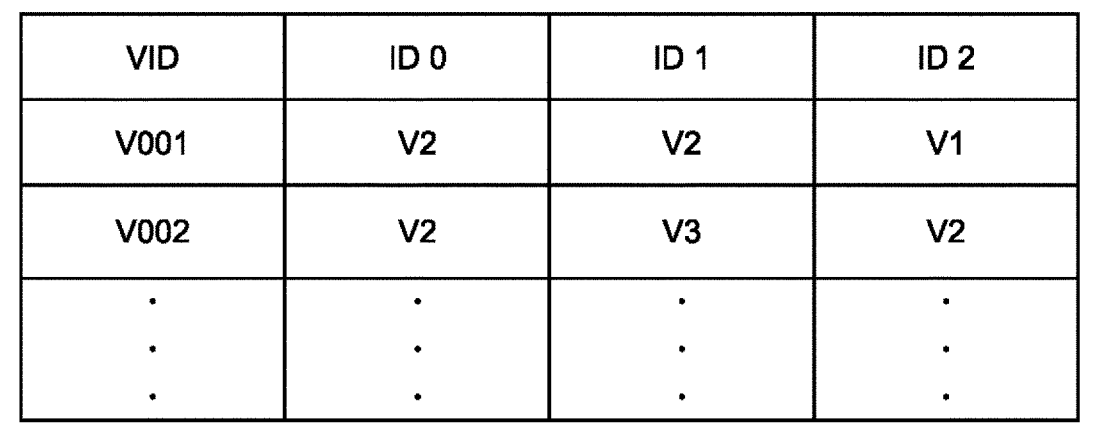

FIG. 8 shows, in a table form, configuration information stored by the external apparatus 70. The configuration information includes a plurality of pieces of management information received from a plurality of vehicles 20. The configuration information includes VIDs, i.e., identification information of the vehicles, and information indicating the program versions of respective ECUs that are included in the pieces of management information received from the respective vehicles.

The external apparatus 70 refers to the configuration information so as to specify the current versions of the programs controlling the respective ECUs provided in a vehicle 20. The external apparatus 70 refers to the program registration information, and when a newer version of a program is registered, the external apparatus 70 selects this program as an update program. The external apparatus 70 transmits the selected update program to the vehicle 20.

Figure 9:
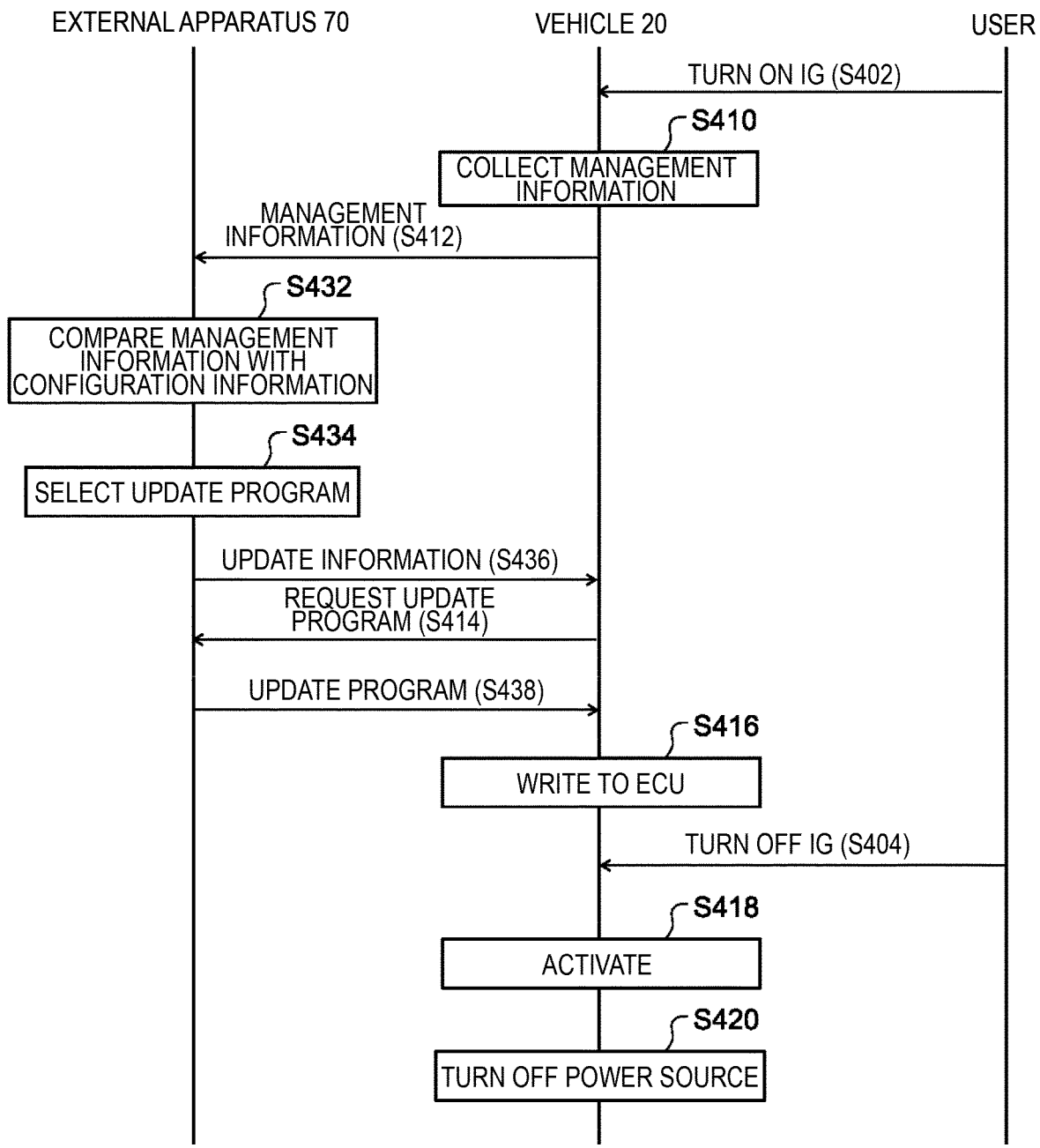
FIG. 9 schematically shows an execution sequence pertaining to a process of selecting an update program for an ECU provided in a vehicle.

FIG. 9 schematically shows an execution sequence pertaining to a process of selecting an update program for an ECU provided in a vehicle. The execution sequence in FIG. 9 ranges from the moment at which the IG switch of the vehicle 20 is turned on to the moment at which the IG power source of the vehicle 20 is turned off.

In the following, descriptions are given of a situation in which an ECU including a double-bank memory is updated. The following is intended to describe a process of selecting an update program on the basis of the version of the current program of an ECU provided in the vehicle, so descriptions are given on the assumption that ECU replacement does not occur.

When the user turns on the IG switch and thus turns on the IG power source of the vehicle 20 in S402, the first acquiring unit 210 and the second acquiring unit 220, in S410, collect hardware serial numbers and version information of programs from the respective ECUs, and stores the same in the internal memory of the ECU 202 as management information.

In S412, the third acquiring unit 230 transmits the management information, including the information collected from the respective ECUs, to the external apparatus 70 via the TCU 201 or the IVI 299. Upon receipt of the management information from the vehicle, the external apparatus 70 compares the received management information with configuration information of the vehicle (S432) and selects an update program (S434). For example, when the received management information matches the configuration information of the vehicle that is stored by the external apparatus 70, the external apparatus 70 may search program registration information so as to select a new version of a program as an update program. When the versions included in the received management information include a version that is older than a version included in the configuration information of the vehicle, the external apparatus 70 searches the program registration information so as to select an update program to be transmitted to the vehicle. Descriptions of these processes are given hereinafter.

When an update program is selected in S434, the external apparatus 70 transmits update information, including identification information of the update program, to the vehicle in S436. In S414, the third acquiring unit 230 of the ECU 202 refers to the update information so as to select an update program to be received, and transmits an update-program request for requesting transmission of the selected update program to the external apparatus 70 via the TCU 201 or the IVI 299.

Upon receipt of the update-program request, the external apparatus 70 transmits the update program requested by the update-program request to the vehicle. Next, the update program is written to the ECU (S416). For example, when having received an update program for the ECU 205, the writing unit 242 of the ECU 202 may forward the received update program to the ECU 205 and give an instruction to write this update program to the program storage region on the inactive side. When the writing of the update program to the program storage region on the inactive side has been complemented, the update program can be activated.

Upon the IG switch being turned off in S404, the update control unit 240 activates the update program (S418). For example, the instruction unit 244 may instruct the ECU 205 to activate the update program. Upon the activation of the update program being completed, the power source of the vehicle is turned off (S420). After the power source of the vehicle is turned off, when the IG switch is turned off, management information is collected from the respective ECUs, and the management information after the program update is transmitted to the external apparatus 70, as in the processes of S410 and S412. As a result, the management information of the vehicle 20 and the management information of the vehicle 20 managed by the external apparatus 70 are synchronous with each other.

Next, descriptions are given of a situation in which, during maintenance of the vehicle 20, the ECU 206 is replaced with an ECU to which an old version of a program has been written. Assume that, before the maintenance of the vehicle 20, management information of all the ECUs provided in the control system 200 matches management information included in configuration information managed by the external apparatus 70. Also assume that none of the ECUs provided in the control system 200 need to undergo a program update.

Figure 10:
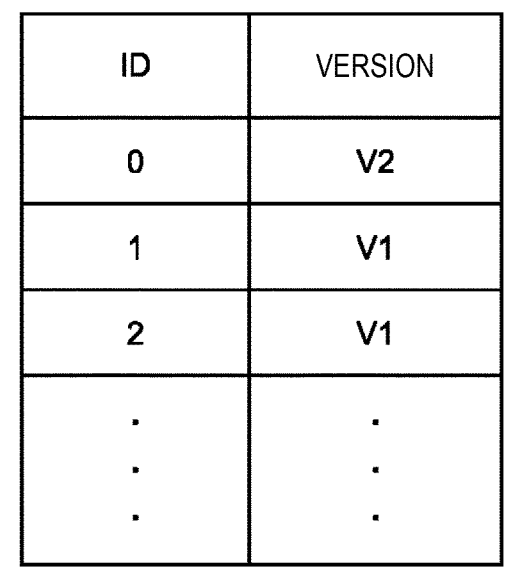

FIG. 10 shows management information stored by the respective ECUs of the vehicle 20 after the maintenance. When the IG power source is turned on, the update control unit 240 recognizes that the ECU 206 has been replaced upon sensing that the hash value of the hardware serial number has been changed. Thus, the third acquiring unit 230 transmits the management information to the external apparatus 70 in order to acquire an update program.

As shown in FIG. 10, the version information of the ID "2" corresponding to the ECU 206 is "V1," which is a version lower than the latest version "V2" corresponding to the ID "2" shown in FIG. 7. Thus, upon receipt of the management information transmitted from the vehicle 20, the external apparatus 70 compares the received management information with the configuration information of the vehicle 20 stored by the external apparatus 70, thereby recognizing that the version of the program of the ECU 206 has been downgraded from "V2" to "V1." In this case, the external apparatus 70 searches the program registration information and selects the version "V2" of a program as an update program. Hence, when the program version becomes inconsistent after the ECU 206 is replaced, update to the latest version of the program managed by the external apparatus 70 can be performed.

With reference to FIG. 10 and the like, the process of the external apparatus 70 selecting an update program has been described by referring to the situation in which the version of a program written to an ECU has been downgraded. However, the processes performed by the control system 200 and the external apparatus 70 may vary according to, for example, the combination of the program version and the progress of a program update for an ECU provided in the control system 200.

FIG. 11 shows a mapping of processes executed by the control system 200 to combinations of program versions and timings at which the IG of the vehicle 20 is turned on.

A "timing 1" indicates a timing at which update information has not been received from the external apparatus 70. A "timing 2" indicates a timing at which an update program is being written to an ECU. A "timing 3" indicates a state after an agreement screen is displayed upon completion of the writing of an update program to an ECU. A "timing 4" indicates a timing after completion of activation of an update program.

A "case 1" indicates a situation in which the version of a program written to an ECU matches the version of a program scheduled to be installed according to update. A "case 2" indicates a situation in which the version of a program written to an ECU is lower than the version of a program scheduled to be installed according to update. A "case 3" indicates a situation in which a program for another system has been written to an ECU. A "case 4" indicates a situation in which the version of a program written to an ECU is the same as the current version.

The "abandon update information" in FIG. 11 indicates that information such as an update program that has been received from the external apparatus 70 is abandoned and that a program that is being written to or has been written to an ECU is not used. The "configuration synchronization" in FIG. 11 indicates the process of the vehicle 20 transmitting management information to the external apparatus 70. Note that the process described above with reference to FIG. 10 corresponds to a process for the "case 2" at the "timing 1" in the table of FIG. 11.

First, descriptions are given of the "case 1. Specifically, the "case 1" corresponds to a case where an ECU is mounted as a result of replacement, in which ECU a same version of a program has been activated as that scheduled by update information to be installed according to update. In the "case 1" at the "timing 1," the control system 200 performs the normal configuration synchronization in view of the non-matching of the hash values of hardware serial numbers. Thus, the external apparatus 70 synchronizes the configuration information and the management information managed by the external apparatus 70 with each other, and then determines that a program update does not need to be executed. Since a program update does not need to be performed, the external apparatus 70 does not transmit update information.

In the "case 1" at the "timing 2," the control system 200 abandons update information and executes the configuration synchronization again. Thus, the external apparatus 70 establishes synchronization with the configuration information managed by the external apparatus 70 and then determines that a program update does not need to be executed. Since a program update does not need to be performed, the external apparatus 70 does not transmit update information. In the "case 1" at the "timing 3," the same process as in the "case 1" at the "timing 2" is executed.

In the "case 1" at the "timing 4," the control system 200 transmits to the external apparatus 70 a notice that an update has succeeded. In view of the fact that an ECU that has written thereto the same version of a program as one scheduled to be installed according to update has been mounted as a result of replacement, the control system 200 transmits to the external apparatus 70 a notice that the update has succeeded. Thus, the same process as one that is executed when update of an ECU before replacement is completed is performed. Note that the situation described above with reference to FIG. 6 and the like corresponds to the situation of the "case 1" at the "timing 4.

Next, descriptions are given of the "case 2." As described above with reference to FIG. 10 and the like, the "case 2" corresponds to a case where an ECU, for which a lower version of a program than a version scheduled by update information to be installed according to update has been activated, is mounted as a result of replacement. In the "case 2" at the "timing 1," as described above with reference to FIG. 10, configuration synchronization is performed in view of the non-matching of the hash values of hardware serial numbers. The external apparatus 70 compares the version in the management information with the version in the configuration information managed by the external apparatus 70, and transmits update information to the control system 200 upon determining that the same version of a program as the program written to the ECU before replacement is to be installed through update.

In the "case 2" at the "timing 2," the control system 200 abandons update information and executes configuration synchronization again. Thus, the process for the program update is canceled, and as in the "case 2" at the "timing 1," update information for updating to the same version of a program as the program written to the ECU before replacement is transmitted to the control system 200. In the "case 2" at the "timing 3," the same process as in the "case 2" at the "timing 2" is executed.

The "case 2" at the "timing 4" means that ECU replacement has been performed after the activation of an update program was completed on the basis of update information. Thus, the control system 200 notifies a failure of update to the user via the MID 298 and the IVI 299 and makes a request for the user to have the vehicle 20 undergo maintenance at the dealer.

Next, descriptions are given of the "case 3." The "case 3" corresponds to, for example, a situation in which an ECU having installed thereon a program for a vehicle type different from the vehicle type of the vehicle 20 has been mounted as a result of replacement. For example, it may be determined whether the situation corresponds to the "case 3" on the basis of the version name of the program. Assume, for example, that it is regulated that programs that have a version name starting with the letter "V" should be installed on the ECUs for the vehicle type to which the vehicle 20 belongs. In this case, if management information stored in an ECU includes a version name starting with the letter "W,"

the control system 200 can determine that this version name is not a correct one for the vehicle 20.

In the "case 3" at the "timing 1," configuration synchronization is performed in view of the non-matching of the hash values of hardware serial numbers, irrespective of the consistency of the version name. By determining the version name, the external apparatus 70 determines that the situation corresponds to the "case 3. In this case, the external apparatus 70 notifies an error to the control system 200. The control system 200 makes, via the MID 298 and the IVI 299, a request for the user to have the vehicle 20 undergo maintenance at the dealer.

In the "case 3" at the "timing 2," the control system 200 abandons update information and executes configuration synchronization again. Thus, as in the "case 3" at the "timing 1," the external apparatus 70 notifies an error to the control system 200. The control system 200 makes, via the MID 298 and the IVI 299, a request for the user to have the vehicle 20 undergo maintenance at the dealer. In the "case 3" at the "timing 3," the same process as in the "case 3" at the "timing 2" is executed.

The "case 3" at the "timing 4" means that replacement with an ECU for a different system has been performed after the activation of an update program was completed on the basis of update information. Thus, the control system 200 notifies a failure of update to the user via the MID 298 and the IVI 299 and makes a request for the user to have the vehicle 20 undergo maintenance at the dealer.

Next, descriptions are given of the "case 4." Specifically, the "case 4" corresponds to a case where an ECU, for which the same version of a program as the current one has been activated, has been mounted as a result of replacement. In the "case 4" at the "timing 1," the control system 200 performs the normal configuration synchronization in view of the non-matching of the hash values of hardware serial numbers. Thus, the external apparatus 70 establishes synchronization with the configuration information managed by the external apparatus 70, and when a latest update program is present, update information is transmitted from the external apparatus 70 to the control system 200.

In the "case 4" at the "timing 2," the control system 200 abandons update information and executes configuration synchronization again. Thus, synchronization with the configuration information managed by the external apparatus 70 is established, and an update program is written to a newly mounted ECU from the beginning. Accordingly, update information for updating to the same version of a program as the program written to the ECU before replacement is transmitted to the control system 200. In the "case 4" at the "timing 3," the same process as in the "case 2" at the "timing 2" is executed. Sensing ECU replacement by using hardware serial numbers and performing configuration synchronization and a program update in the described manner allows the inactive side of a newly mounted ECU to be prevented from being activated.

The "case 4" at the "timing 4" means that ECU replacement has been performed after the activation of an update program was completed on the basis of update information. Thus, the control system 200 notifies a failure of update to the user via the MID 298 and the IVI 299 and makes a request for the user to have the vehicle 20 undergo maintenance at the dealer.

As described above, when an ECU provided in the control system 200 is replaced, the update system 10 according to the present embodiment allows for update to the same version of a program as the program written to the ECU before replacement. Hence, functions that were added in the past in an OTA manner can be sufficiently utilized.

The vehicle 20 is an example of a transport machine. The vehicle may be an automobile such as an automobile provided with an internal combustion engine, an electric automobile, or a fuel-cell vehicle (FCV). The automobile may be a bus, a truck, or a two-wheeled vehicle. The vehicle may be a saddled vehicle or a bike. The transport machine may be, besides a vehicle, an aircraft such as an unmanned aircraft or a machine such as a ship. The transport machine may be any machine for transporting humans or products. The transport machine is an example of a moving body. The moving body is not limited to a transport machine and may be any machine that can move.

Figure 12:
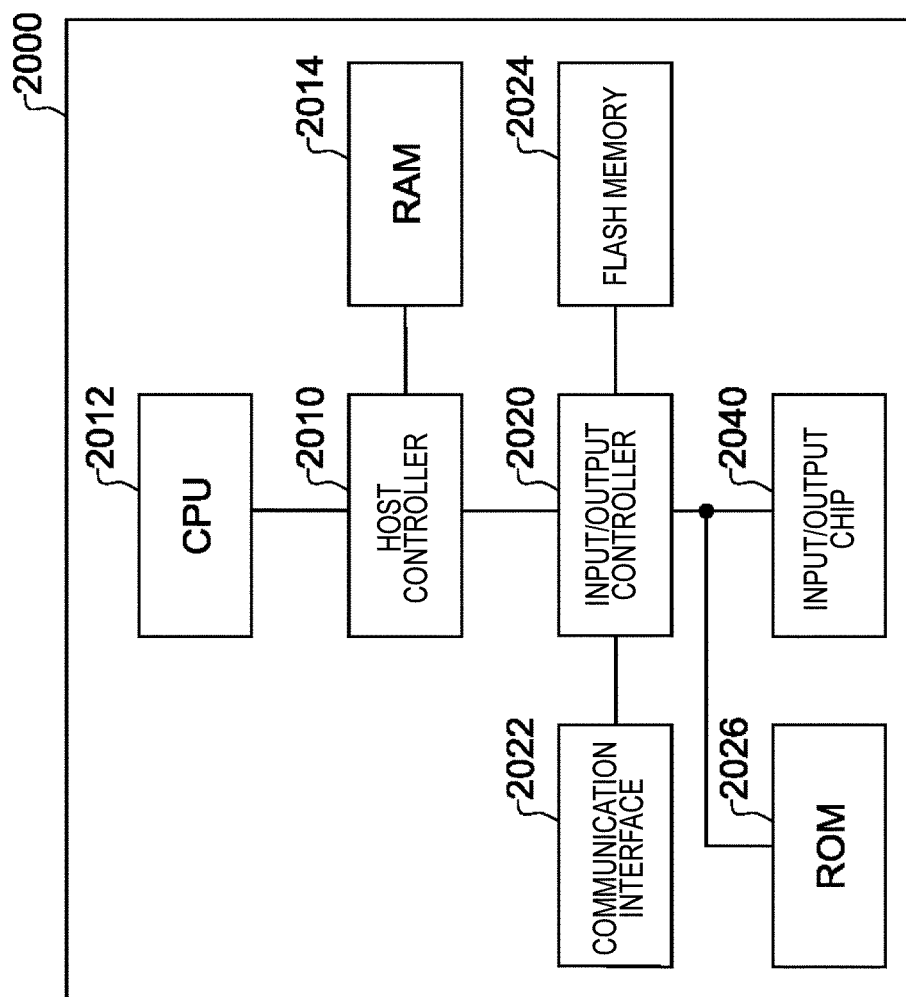
FIG. 12 shows an example of a computer 2000.

FIG. 12 shows an example of a computer 2000 that may entirely or partially implement a plurality of embodiments of the present invention. A program installed in the computer 2000 can allow the computer 2000 to: function as systems such as the control systems according to embodiments or components of the systems, or as apparatuses such as various apparatuses or components of the apparatuses; perform operations associated with the systems or components of the systems or with the apparatuses or components of the apparatuses; and/or perform processes according to embodiments or steps in the processes. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer-readable storage media such as a CD-ROM, a DVD-ROM, or a memory card. The RAM 2014, the ROM 2026, or the flash memory 2024 is an example of the computer-readable storage medium. Programs are installed in the flash memory 2024, the RAM 2014, or the ROM 2026 and executed by the CPU 2012. The information processing described in these programs is read into the computer 2000, resulting in cooperation between a program and the above-mentioned various types of hardware resources. An apparatus or method may be constituted by realizing the operation or processing of information in accordance with the usage of the computer 2000.

For example, when communication is performed between the computer 2000 and an external device, the CPU 2012 may execute a communication program loaded onto the RAM 2014 to instruct communication processing to the communication interface 2022, based on the processing described in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, processing of information, condition judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage media on the computer 2000 or near the computer 2000. A recording medium such as a hard disk or a RAM provided in a server system connected to a dedicated communication network or the Internet can be used as the computer-readable storage media. A program stored in the computer-readable storage medium may be provided to the computer 2000 via a network.

Programs that are installed in the computer 2000 and cause the computer 2000 to function as the control system 200 may contact the CPU 2012 or the like so as to cause the computer 2000 to function as each unit of the control system 200 (e.g., as the ECU 202). The information processing described in these programs is read into the computer 2000 so as to function as each unit of the control system 200, which is constituted by specific means in which software and the above-mentioned various types of hardware resources cooperate with each other. By using these specific means, information computation or processing corresponding to purposes of use of the computer 2000 in the present embodiment can be realized, thereby building a particular control system 200 corresponding to the purposes of use.

Various embodiments have been described by referring to the block diagrams and the like. Each block in the block diagrams may represent (1) steps of processes in which operations are performed or (2) sections of apparatuses responsible for performing operations. Certain steps and sections may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable storage media may include any tangible device that can store instructions for execution by a suitable device, such that the computer-readable storage medium having instructions stored therein forms at least a portion of an article of manufacture including instructions which can be executed to create means for performing processing operations or operations specified in the block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disc, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing described processing operations or operations specified in the block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: Update system
20: Vehicle
70: External apparatus
90: Communication network
200: Control system
201: TCU
202: ECU
204: ECU
205: ECU
206: ECU
210: First acquiring unit
220: Second acquiring unit
230: Third acquiring unit
240: Update control unit
242: Writing unit
244: Instruction unit
260: Notice control unit
270: Storage control unit
280: In-vehicle communication line
294: FI
295: Advanced safety system
296: Battery
298: MID
299: IVI
2000: Computer
2010: Host controller
2012: CPU
2014: RAM
2020: Input/output controller
2022: Communication interface
2024: Flash memory
2026: ROM
2040: Input/output chip

What is claimed is:
1. An update control apparatus comprising:
at least one processor;
a first acquiring unit configured to acquire information based on a unique value of a moving-body control unit for controlling at least a portion of a moving body using the at least one processor;
a storage control unit configured to cause the information based on the unique value acquired by the first acquiring unit to be stored using the at least one processor;
a second acquiring unit configured to acquire version information of a program for performing control by the moving-body control unit from a first storage region of a storage apparatus provided in the moving-body control unit using the at least one processor;
a third acquiring unit configured to acquire, on a basis of the version information acquired by the second acquiring unit, a newer version of the program for performing the control by the moving-body control unit using the at least one processor;
a writing unit configured to write the new version of the program acquired by the third acquiring unit to a second storage region provided in the storage apparatus using the at least one processor; and
an instruction unit configured to output an instruction to cause the moving-body control unit to control in accordance with the program stored in the second storage region using the at least one processor, wherein
the instruction unit is configured to output the instruction after acquiring the information based on the unique value acquired by the first acquiring unit,
the instruction unit is configured to output the instruction when information based on a unique value newly acquired by the first acquiring unit is consistent with the information stored by the storage control unit,
at powering-on of the moving body, the first acquiring unit is configured to newly acquire information based on the unique value of the moving-body control unit, and the instruction unit is configured to determine whether the information based on the unique value newly acquired by the first acquiring unit is consistent with the information stored by the storage control unit,
at powering-on of the moving body after an output of the instruction from the instruction unit,
the first acquiring unit is configured to newly acquire information based on the unique value of the moving-body control unit, and
the second acquiring unit is configured to newly acquire version information of the program for performing the control by the moving-body control unit, and
the update control apparatus further comprises:
a notice control unit configured to notify that a version of the program for performing the control by the moving-body control unit is updated, when the information based on the unique value newly acquired by the first acquiring unit at the powering-on of the moving body after the output of the instruction from the instruction unit is inconsistent with the information stored by the storage control unit, in a case where the version information newly acquired by the second acquiring unit at the powering-on of the moving body after the output of the instruction from the instruction unit is consistent with version information of the program that was stored in the second storage region when the instruction unit output the instruction.

2. An update control apparatus comprising:
at least one processor;
a first acquiring unit configured to acquire information based on a unique value of a moving-body control unit for controlling at least a portion of a moving body using the at least one processor;
a storage control unit configured to cause the information based on the unique value acquired by the first acquiring unit to be stored using the at least one processor;
a second acquiring unit configured to acquire version information of a program for performing control by the moving-body control unit from a first storage region of a storage apparatus provided in the moving-body control unit using the at least one processor;
a third acquiring unit configured to acquire, on a basis of the version information acquired by the second acquiring unit, a newer version of the program for performing the control by the moving-body control unit using the at least one processor;
a writing unit configured to write the new version of the program acquired by the third acquiring unit to a second storage region provided in the storage apparatus using the at least one processor; and an instruction unit configured to output an instruction to cause the moving-body control unit to control in accordance with the program stored in the second storage region using the at least one processor, wherein the instruction unit is configured to output the instruction after acquiring the information based on the unique value acquired by the first acquiring unit, the instruction unit is configured to output the instruction when information based on a unique value newly acquired by the first acquiring unit is consistent with the information stored by the storage control unit, at powering-on of the moving body, the first acquiring unit is configured to newly acquire information based on the unique value of the moving-body control unit, and the instruction unit is configured to determine whether the information based on the unique value newly acquired by the first acquiring unit is consistent with the information stored by the storage control unit, the first acquiring unit is configured to newly acquire information based on the unique value of the moving-body control unit at powering-on of the moving body performed in a period after a moment at which the writing unit starts to write, to the second storage region, the new version of the program acquired by the third acquiring unit and before a moment at which the instruction unit outputs the instruction, and when the information based on the unique value newly acquired by the first acquiring unit at the powering-on of the moving body performed in the period is inconsistent with the information stored by the storage control unit, the second acquiring unit is configured to newly acquire version information of the program for performing the control by the moving-body control unit, and on a basis of the version information newly acquired by the second acquiring unit, the third acquiring unit is configured to acquire again a newer version of the program for performing the control by the moving-body control unit from an external apparatus external to the moving body.

3. The update control apparatus of claim 1, wherein the moving body is a vehicle.

4. The update control apparatus of claim 1, wherein the first acquiring unit is configured to newly acquire information based on the unique value of the moving-body control unit at powering-on of the moving body performed in a period after a moment at which the writing unit starts to write, to the second storage region, the new version of the program acquired by the third acquiring unit, and before a moment at which the instruction unit outputs the instruction, and when the information based on the unique value newly acquired by the first acquiring unit at the powering-on of the moving body performed in the period is inconsistent with the information stored by the storage control unit, the second acquiring unit is configured to newly acquire version information of the program for performing the control by the moving-body control unit, and on a basis of the version information newly acquired by the second acquiring unit, the third acquiring unit is configured to acquire again a newer version of the program for performing the control by the moving-body control unit from an external apparatus external to the moving body.

5. A moving body comprising the update control apparatus of claim 1.

6. An update control method comprising:

acquiring information based on a unique value of a moving-body control unit for controlling at least a portion of a moving body;

causing the information based on the acquired unique value to be stored;

acquiring version information of a program for performing control by the moving-body control unit from a first storage region of a storage apparatus provided in the moving-body control unit;

acquiring, on a basis of the acquired version information, a newer version of the program for performing the control by the moving-body control unit;

writing the acquired new version of the program to a second storage region provided in the storage apparatus; and after acquiring the information based on the unique value, outputting an instruction to cause the moving-body control unit to control in accordance with the program stored in the second storage region, the outputting the instruction includes outputting the instruction when information based on a unique value newly acquired is consistent with the stored information, at powering-on of the moving body, the acquiring information includes newly acquiring information based on the unique value of the moving-body control unit, and the outputting the instruction includes determining whether the information based on the unique value newly acquired is consistent with the stored information, at powering-on of the moving body after the output of the instruction, the acquiring information includes newly acquiring information based on the unique value of the moving-body control unit, and the acquiring version information includes newly acquiring version information of the program for performing the control by the moving-body control unit, and the update control method further comprises:

notifying that a version of the program for performing the control by the moving-body control unit is updated, when the information based on the unique value newly acquired at the powering-on of the moving body after the output of the instruction is inconsistent with the stored information, in a case where the version information newly acquired at the powering-on of the moving body after the output of the instruction is consistent with version information of the program that was stored in the second storage region when outputting the instruction.

7. A non-transitory computer-readable storage medium having stored thereon a program that causes a computer to perform operations comprising:

acquiring information based on a unique value of a moving-body control unit for controlling at least a portion of a moving body;

causing the information based on the acquired unique value to be stored;

acquiring version information of a program for performing control by the moving-body control unit from a first storage region of a storage apparatus provided in the moving-body control unit;

acquiring, on a basis of the acquired version information, a newer version of the program for performing the control by the moving-body control unit;

writing the acquired new version of the program to a second storage region provided in the storage apparatus; and after acquiring the information based on the unique value, outputting an instruction to cause the moving-body control unit to control in accordance with the program stored in the second storage region, the outputting the instruction includes outputting the instruction when information based on a unique value newly acquired is consistent with the stored information, at powering-on of the moving body, the acquiring information includes newly acquiring information based on the unique value of the moving-body control unit, and the outputting the instruction includes determining whether the information based on the unique value newly acquired is consistent with the stored information, at powering-on of the moving body after the output of the instruction, the acquiring information includes newly acquiring information based on the unique value of the moving-body control unit, and the acquiring version information includes newly acquiring version information of the program for performing the control by the moving-body control unit, and the program further causes the computer to:

notify that a version of the program for performing the control by the moving-body control unit is updated, when the information based on the unique value newly acquired at the powering-on of the moving body after the output of the instruction is inconsistent with the stored information, in a case where the version information newly acquired at the powering-on of the moving body after the output of the instruction is consistent with version information of the program that was stored in the second storage region when outputting the instruction.

\* \* \* \* \*